(12) United States Patent
Lu et al.

(10) Patent No.: US 11,809,303 B2
(45) Date of Patent: Nov. 7, 2023

(54) HIGH-PERFORMANCE COMPUTING-ORIENTED METHOD FOR AUTOMATICALLY DEPLOYING EXECUTION ENVIRONMENT ALONG WITH JOB

(71) Applicant: NATIONAL UNIVERSITY OF DEFENSE TECHNOLOGY, Hunan (CN)

(72) Inventors: Kai Lu, Hunan (CN); Wenzhe Zhang, Hunan (CN); Ruibo Wang, Hunan (CN); Wanqing Chi, Hunan (CN); Yong Dong, Hunan (CN); Wei Zhang, Hunan (CN); Huijun Wu, Hunan (CN); Mingtian Shao, Hunan (CN)

(73) Assignee: NATIONAL UNIVERSITY OF DEFENSE TECHNOLOGY, Hunan (CN)

( * ) Notice: Subject to any disclaimer, the term of this patent is extended or adjusted under 35 U.S.C. 154(b) by 76 days.

(21) Appl. No.: 17/535,702

(22) Filed: Nov. 26, 2021

(65) Prior Publication Data
US 2022/0179774 A1 Jun. 9, 2022

(30) Foreign Application Priority Data
Dec. 3, 2020 (CN) .......................... 202011395015.4

(51) Int. Cl.
G06F 11/36 (2006.01)
G06F 9/445 (2018.01)
H04L 9/40 (2022.01)

(52) U.S. Cl.
CPC ...... *G06F 11/3656* (2013.01); *G06F 9/44505* (2013.01); *G06F 11/366* (2013.01); *H04L 63/083* (2013.01)

(58) Field of Classification Search
None
See application file for complete search history.

(56) References Cited

U.S. PATENT DOCUMENTS

| | | | |
|---|---|---|---|
| 9,965,377 B1 * | 5/2018 | Russell | G06F 11/28 |
| 2006/0195559 A1 * | 8/2006 | Winter | G06F 8/60 |
| | | | 709/223 |

(Continued)

OTHER PUBLICATIONS

V. Oliveira, A. M. Pina and A. Rocha, "Running User-Provided Virtual Machines in Batch-Oriented Computing Clusters," 2012 20th Euromicro International Conference on Parallel, Distributed and Network-based Processing, Munich, Germany, 2012, pp. 583-587, doi: 10.1109/PDP.2012.91. (Year: 2012).*

(Continued)

*Primary Examiner* — Andrew M. Lyons
(74) *Attorney, Agent, or Firm* — JCIP GLOBAL INC.

(57) ABSTRACT

A high-performance computing-oriented method for automatically deploying an execution environment along with a job, including: presetting isolated execution environments at nodes of a high-performance computing system; logging in an isolated execution environment of a login node; carrying out development and debugging on the job and configuration on a job execution environment at the login node, and issuing a job running request to a job management system; assigning compute nodes from the nodes of the high-performance computing system to the job of the user by the job management system, automatically deploying an file system of the user synchronously to the assigned compute nodes along with the job when the job is loaded, and running the job of the user by the corresponding compute nodes; and feeding results back to the login node of the user after running the job is completed, then clearing file systems.

8 Claims, 3 Drawing Sheets

(56) References Cited

U.S. PATENT DOCUMENTS

| | | | |
|---|---|---|---|
| 2016/0098263 A1* | 4/2016 | Spivak | G06F 9/5055 |
| | | | 717/170 |
| 2017/0201569 A1* | 7/2017 | Fu | G06F 9/45558 |
| 2019/0354354 A1* | 11/2019 | Dubinskii | G06F 11/3466 |
| 2020/0371782 A1* | 11/2020 | Baierlein | H04L 63/0807 |
| 2020/0394120 A1* | 12/2020 | Fathi Salmi | G06F 8/65 |

OTHER PUBLICATIONS

M. A. Salim, T. D. Uram, J. T. Childers, P. Balaprakash, V. Vishwanath and M. E. Papka, "Balsam: Automated Scheduling and Execution of Dynamic, Data-Intensive HPC Workflows," arXiv:1909.08704v1 [cs.DC], Sep. 18, 2019. (Year: 2019).*

* cited by examiner

HIGH-PERFORMANCE COMPUTING-ORIENTED METHOD FOR AUTOMATICALLY DEPLOYING EXECUTION ENVIRONMENT ALONG WITH JOB

CROSS-REFERENCE TO RELATED APPLICATION

This application claims the priority benefit of China application serial no. 202011395015.4, filed on Dec. 3, 2020. The entirety of the above-mentioned patent application is hereby incorporated by reference herein and made a part of this specification.

BACKGROUND OF THE INVENTION

1. Technical Field

The invention relates to the field of software of computer systems, and in particular, relates to a high-performance computing-oriented method for automatically deploying an execution environment along with a job.

2. Description of Related Art

In an existing high-performance computer system, physical nodes are divided into login nodes and compute nodes. After the users issue job requests at the login nodes, the high-performance computing system assigns the compute nodes through a job management system in response to these requests, thereby completing corresponding tasks. In this process, there are mainly the following modes at present.

I. Traditional Mode of Executing High-Performance Computing Jobs

FIG. 1 shows a diagram of a traditional mode of executing a high-performance computing job. Please refer to FIG. 1. In a traditional high-performance computing system, login nodes are shared among users 101-103. After logging in a login node 111, a user (e.g., 101) carries out development and debugging on his/her own application in an environment of the login node. At this time, the user may configure several libraries and dependencies that are not present in the original system. When the user is ready to execute a job on the compute node 121, a user in tradition generally configures an execution environment required at the compute node 121 by two types of methods. In a first method, the user copies the libraries and dependencies required by the job directly to corresponding compute nodes, and then appoint these corresponding nodes to run when the job is executed. In a second method, the libraries and dependencies required by the job are configured into a global shared file system, and the job can be executed as long as paths related to the libraries and dependencies are appointed by parameters.

Such a job management system mainly has the following disadvantages:

1. The user has a huge burden of deploying the job since the user needs to manually configure the environment in order to normally execute the job, and in the first method, the larger the number of the used compute nodes, the higher the burden of manual configuration; and 2. The original environment of the high-performance computing system is changed. A compute node that has been configured by one user would certainly affects its use by other users, leading to chaos of the configuration of system environment, and user privacy cannot be protected in such an environment.

II. Container-Dependent Mode of Deploying Jobs

The libraries and dependencies to be used by one job would be complicated. In order to make the job deployment easier, the container technology has been applied to the job deployment in high-performance computing. For example, in the case of docker, an execution environment is encapsulated into a container image, by which the migration and deployment of a job can be implemented fast. On a compute node 121, a user only needs to deploy the encapsulated container image, which amounts to configuring a complete system environment required by the job. With the container technology integrated, such a job management system for high-performance computing is somewhat improved in efficiency compared with the traditional method.

However, this method still has corresponding disadvantages as follows:

1. Since the user encapsulates the execution environment of his/her own job by using a container, it is necessary to include the complete system environment required by this job in the content of the container, and the content must be manually maintained by the user, which brings a great burden to the user;

2. Besides encapsulating the execution environment of the job to generate the container image, the user also needs to manually deploy the container image to a compute node or a global shared filed system, and the job management system needs to be appointed to run this container image when the job is run by the job management system, both of which still bring a great burden to the user; and 3. The isolation technology used in the traditional container results in high performance overhead for running the job.

BRIEF SUMMARY OF THE INVENTION

To solve the technical problem, an object of the invention is to provide, in view of the technical problems existing in the prior art, a high-performance computing-oriented method for automatically deploying an execution environment along with a jog, which improves the job deployment efficiency in high-performance computing by a lightweight execution environment, reduces the burden of users to achieve almost negligible overhead, and reduces the burden of users in environment configuration.

To settle the aforesaid technical issue, the technical solution proposed by the present invention is:

A high-performance computing-oriented method for automatically deploying an execution environment along with a job, comprising the following steps:

S1) presetting isolated execution environments at nodes of a high-performance computing system, wherein the sharing and free customization of an environment and the automatic deployment of the execution environment are enabled for a user based on an overlay file system, and mutually independent development and execution environments are implemented among a plurality of users in combination with process isolation.

S2) logging in an isolated execution environment of a login node by a user, wherein the user logs in the login node of the high-performance computing system, and an isolated lightweight development environment is provided to the user by a high-performance-oriented mechanism for automatically deploying the execution environment along with the job.

S3) carrying out development and debugging on the job and configuration on a job execution environment by the user at the login node, and issuing a job running request to a job management system by the user.

S4) assigning compute nodes from the nodes of the high-performance computing system to the job of the user by the job management system, automatically deploying an upper file system of the user synchronously to the assigned compute nodes along with the job when the job is loaded, and then running the job of the user by the corresponding compute nodes.

S5) feeding results back to the login node of the user by the compute nodes after running the job is completed, then clearing self-upper file systems by the compute nodes, and ending a process of the job.

Further, Step S1) specifically comprises: presetting lower file systems at the login node and the compute nodes of the high-performance computing system by taking a standard system environment as a lower layer of the overlay file system and a user-defined dependency required for job running as an upper layer of the overlay file system; monitoring a user login request by running a daemon process at the login node; and at the same time, integrating the mechanism for automatically deploying the execution environment along with the job into the job management system.

Further, the mechanism for automatically deploying the execution environment along with the job specifically comprises: when receiving the user job running request from the login node, the job management system first assign the compute nodes to the login node, and then launches a lightweight execution environment at each of the compute nodes, so that a user-defined environment at the login node is automatically synchronized to the compute nodes to act as the execution environment of the job.

Further, Step S2) specifically comprises:

S21) issuing a login request by the user to the login node of the high-performance computing system.

S22) continuously monitoring by a daemon process at the login node, launching a lightweight execution environment as a login space of the user after the login request of the user is received, wherein the lightweight execution environment comprises an isolation process having a complete process tree, and an empty upper file system.

S23) logging by the user in the lightweight execution environment that is launched at the login node.

Further, S3) specifically comprises:

S31) directly using a standard configuration of the lower file system by the user according to actual needs.

S32) carrying out development and debugging on the unique job of the user's own in the upper file system by the user, and at the same time, carrying out independent configuration on a unique execution dependency by the user.

S33) executing a job running command after the development and debugging of the job of the user is completed at the login node, and issuing the job running request to the job management system.

Further, S4) specifically comprises:

S41) assigning the corresponding compute nodes to the job by the job management system based on loads of the compute nodes in a current system after the job management system receives the job running request from the user, launching a lightweight execution environment on each of the compute nodes as an execution space for the job, wherein the lightweight execution environment comprises an isolation process having a complete process tree, and an empty upper file system.

S42) synchronizing the upper file system of the user on the login node to the assigned compute nodes, wherein the upper file system on the login node is taken as an upper file system of each of the compute nodes.

S43) executing the job by the assigned compute nodes based on a job content and a dependency required by the job of the user in the upper file system.

The invention also proposed a high-performance computing-oriented apparatus for automatically deploying an execution environment, comprising a computer device, wherein the computer device is programmed or configured to execute the high-performance computing-oriented method for automatically deploying the execution environment along with the job.

The invention also proposed a computer-readable storage medium, wherein the computer-readable storage medium stores a computer program which is programmed or configured to execute the high-performance computing-oriented method for automatically deploying the execution environment along with the job.

Compared with the prior art, the invention has the following advantages.

1. According to the invention, the process of deploying the user's job and execution environment at the compute node is transparent to the user. From the user's point of view, this process is entirely completed automatically, which largely reduces the burden of the user. Meanwhile, such a mechanism of automatically deploying the execution environment along with the job is more efficient compared with the manual deployment of the user, which is particularly true in a high-performance computing scenario.

2. In the invention, the overlay file system is only used to implement the free customization of the execution environment for the user, without the introduction of the traditional container image, such that that the space overhead is relatively low. Meanwhile, the invention is lower in isolation level compared with the traditional container technology. For the high-performance computing scenario, these can ensure to maintain lower performance overhead while meeting user needs.

3. The invention supports the free customization of the execution environment of the user's own; a system administrator maintains and manages a lower basic environment, and the development environments among the users are mutually isolated without mutual interferences. Compared with the traditional usage scenario of the high-performance computing system, the invention provides the users with greater autonomy and protects the user privacy while ensuring that the users share the standard system configuration. Meanwhile, the free customization of the user will not affect the lower system environment, thereby improving the safety of the system.

DETAILED DESCRIPTION OF THE INVENTION

The invention will be further described below in conjunction with the accompanying drawings and the specific preferred embodiments, but the protection scope of the invention is not limited thereto.

To solve problem mentioned above, the invention first introduces the concept of a lightweight execution environment, in which application dependencies are encapsulated by simply using an overlay file system; a standard system environment is taken as a lower layer of the overlay file system; and user-defined dependencies required by running a job and the like are taken as an upper layer of the overlay file system. In this way, each user can share the standard system environment, and the changes and customization made by the users to the environment will not exert an influence among the users. Compared with the traditional container, such an execution environment is more lightweight, with lower overhead. Second, in terms of deploying the execution environment, a transparent method of automatically deploying the execution environment along with a job is provided. Firstly, the lower file systems preset on the login node and the compute nodes of the user are common layers to provide the standard system environment. The customization that the user defines various execution libraries on the login node occurs at the upper file system. Then, during the loading of the job, the job management system automatically deploys the upper file system to the assigned compute nodes along with the job to enable automatic deployment.

Figure 1:
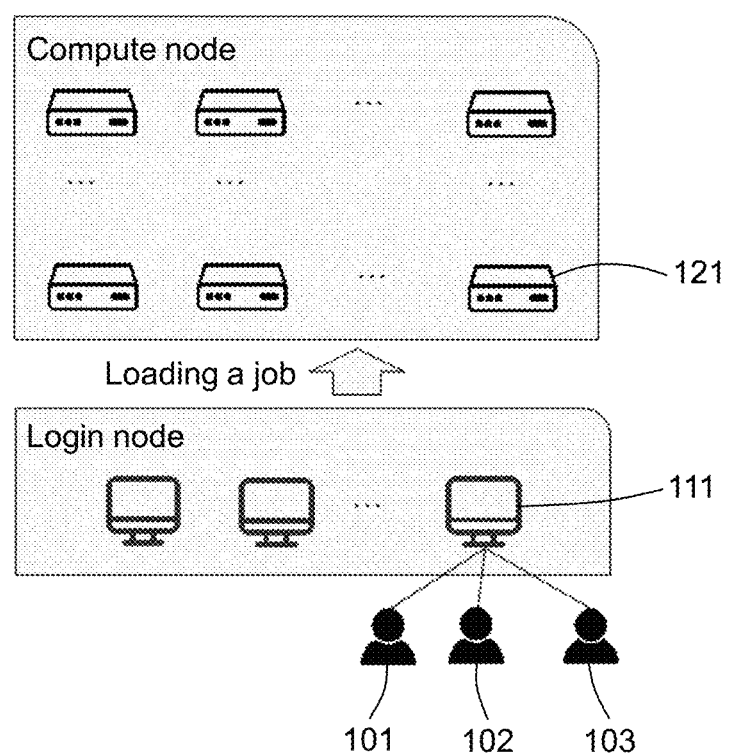
FIG. 1 shows a diagram of a traditional mode of executing a high-performance computing job.
Figure 2:
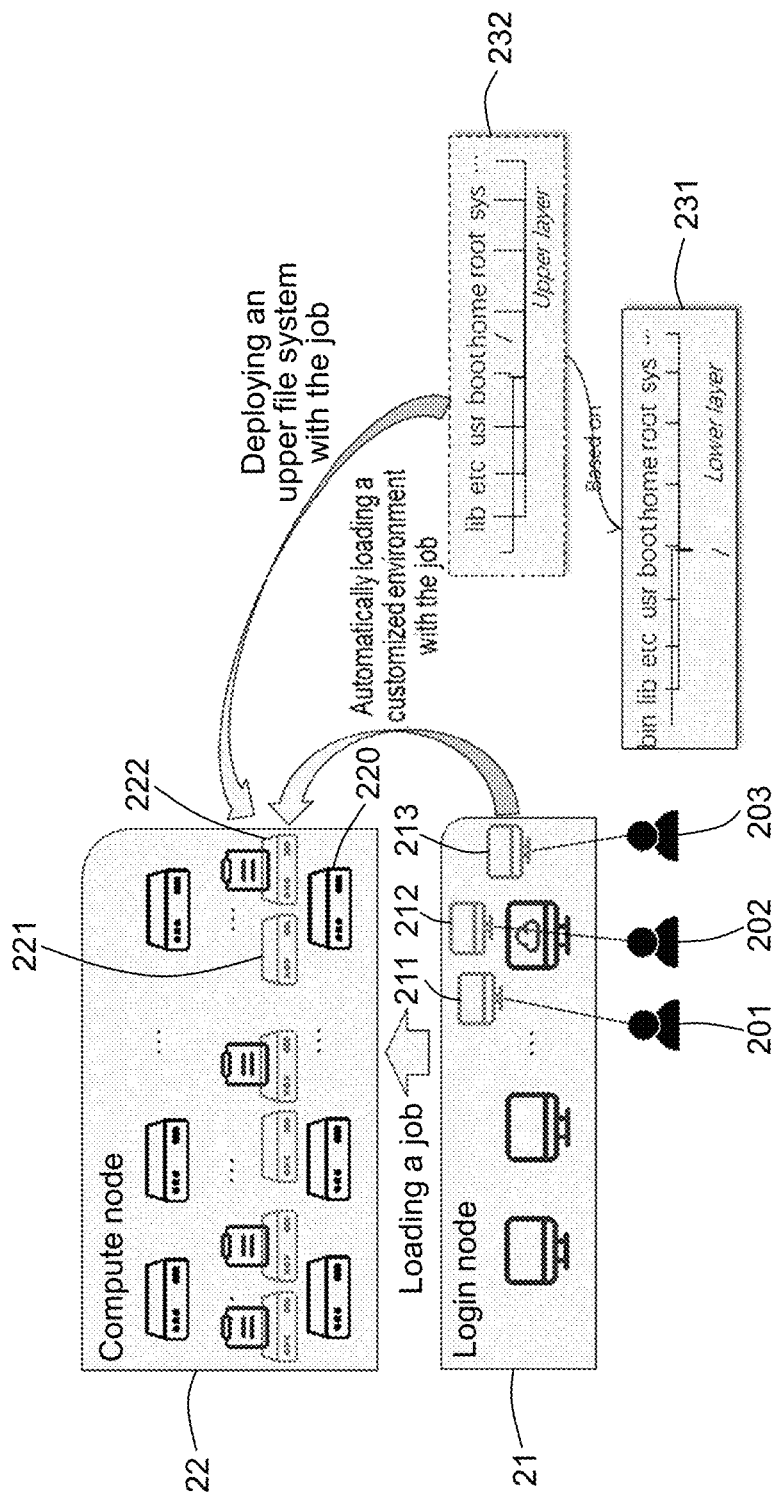
FIG. 2 shows a schematic diagram of the deployment of an execution environment according to the invention.

The core idea of the invention is to improve the job deployment efficiency of the high-performance computing by the lightweight execution environment, thereby reducing the burden of users to achieve almost negligible overhead. FIG. 2 shows a schematic diagram of the deployment of an execution environment according to the invention. Please refer to FIG. 2. Generally speaking, first, the overly file system is designed at the login node and compute nodes of a high-performance computer to realize the customization and isolation of a shared environment among a plurality of users. Here, the lower file system 231 is a standard system environment managed and maintained by the system administrator; the upper file system 232 is a freely customizable space for each of the users, who can deploy their own jobs at the upper file system 232 and configure corresponding operation dependencies. At the login node, an isolated execution environment is designed for a logged user, and is realized by process isolation and the overlay file system. For example, when a new user 201 logs in, the login node 211 launches and isolates a new process, such that each of the users independently owns a complete process tree, and independently owns his/her own upper file system 232 based on the shared lower file system 231. That is, in the case that the standard system configuration is shared, the customization of the user's own execution environment can be carried out. This process neither affects the lower file system 231 nor affects different users 201-203, and is low in time overhead since it is completed within an ultrashort time. Meanwhile, the space overhead is extremely low since the space is not occupied by the traditional container image and the initialization of the upper file system 232 is also null. Next, when the user 201 executes the job running command after finishing the configuration of his/her own execution environment 211, the job management system loads the job while automatically deploying the upper file system 232 of the user 201 to the assigned compute nodes 221-222 along with the job (as shown in FIG. 2). From the point view of the user, this process is transparent and is automatically completed, which greatly reduces the burden of the user 201 in system configuration.

Figure 3:
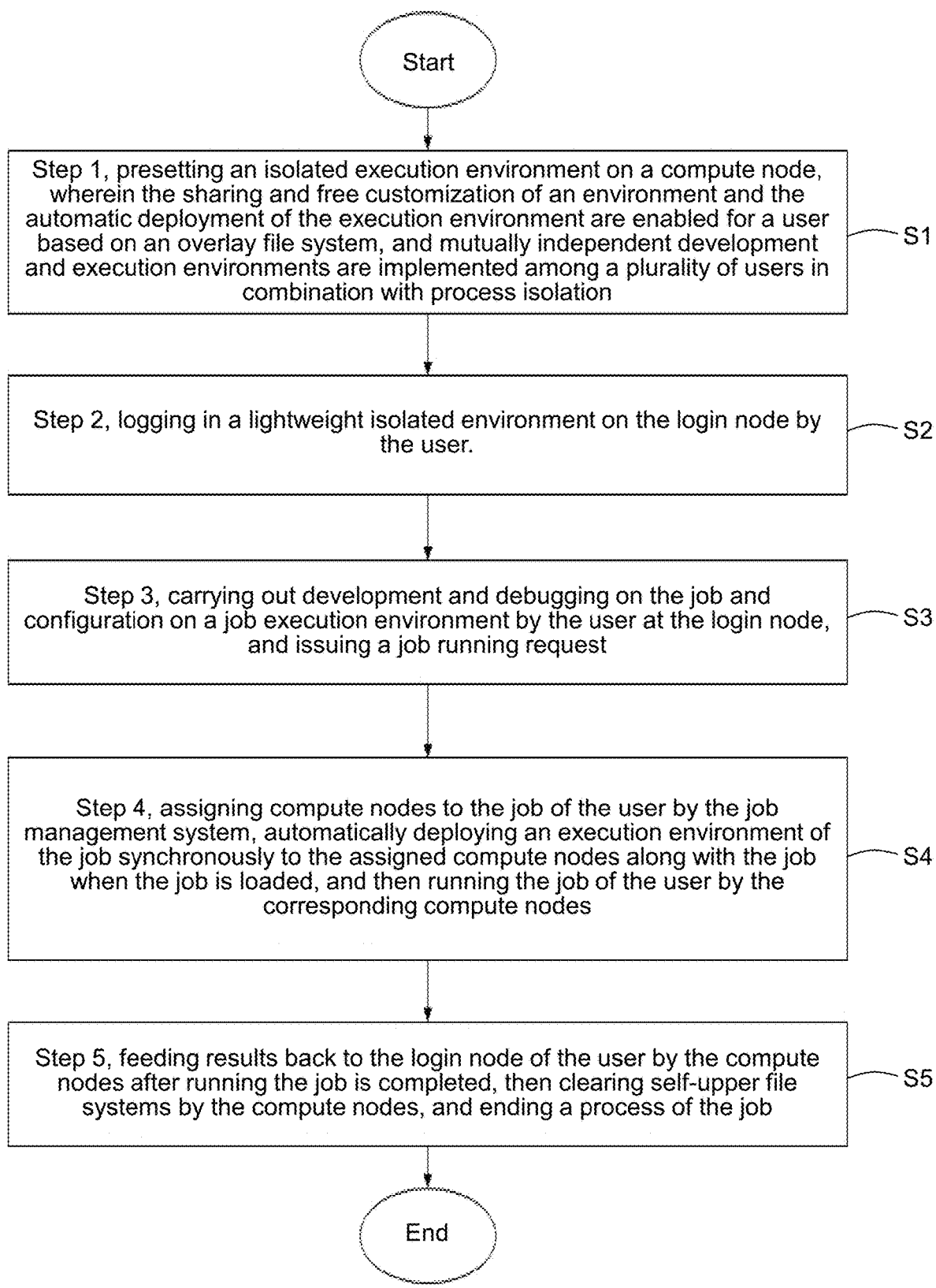
FIG. 3 shows a general flowchart according to the invention.

As shown in FIG. 3, the invention provides a high-performance computing-oriented method for automatically deploying an execution environment along with a job. The method includes the following steps:

S1) presetting isolated execution environments at nodes of a high-performance computing system, wherein the sharing and free customization of an environment and the automatic deployment of the execution environment are enabled for a user based on an overlay file system, and mutually independent development and execution environments are implemented among a plurality of users in combination with process isolation.

S2) logging in an isolated execution environment of a login node by a user, wherein the user logs in the login node of the high-performance computing system, and an isolated lightweight development environment is provided to the user by a high-performance-oriented mechanism for automatically deploying the execution environment along with the job.

S3) carrying out development and debugging on the job and configuration on a job execution environment by the user at the login node, and issuing a job running request to a job management system by the user.

S4) assigning compute nodes from the nodes of the high-performance computing system to the job of the user by the job management system, automatically deploying an upper file system of the user synchronously to the assigned compute nodes along with the job when the job is loaded, and then running the job of the user by the corresponding compute nodes.

S5) feeding results back to the login node of the user by the compute nodes after running the job is completed, then clearing self-upper file systems by the compute nodes, and ending a process of the job.

S1) in this embodiment specifically includes: presetting lower file systems at the login node and the compute nodes of the high-performance computing system by taking a standard system environment as an lower layer of the overlay file system and a user-customized dependency required for job running as an upper layer of the overlay file system; monitoring a user login request by running a daemon process at the login node; and at the same time, integrating the mechanism for automatically deploying the execution environment along with the job in the job management system. In the high-performance computing system, the nodes are divided into compute nodes and login nodes; and the job management system is responsible for handling job requests issued by the login nodes and assigning computing tasks to appropriate compute nodes. In the invention, the overlay file system is only used to realize the free customization of the execution environment for the user, without the introduction of the traditional container image, so that the space overhead is relatively low. Meanwhile, the invention is lower in isolation level compared with the traditional container technology. For the high-performance computing scenario, these can ensure to maintain lower performance overhead while meeting user needs.

Running the daemon process on the login node is to provide a logged-in user with an isolated development environment. In the high-performance computing system, when a user logs in the login node, the daemon process on the login node continuously monitors if the user has a login request; and when the login request from the user is monitored, the daemon process is responsible for launching a new isolation process, which independently owns a complete process tree. Then, an empty file system is stacked as an upper layer of the overlay file system, also as a development and configuration space of the user.

The mechanism for automatically deploying the execution environment along with the job specifically includes: first, assigning the compute node to the login node by the job management system when the job management system receives the user job running request from the login node, and then, launching a lightweight execution environment at the compute node, so that a user-customized environment at the login node is automatically synchronized to the compute nodes to act as the execution environment of the job. When receiving the job running request from the login node, the traditional job management system assigns the compute nodes and then directly runs the job on the compute nodes. However, the job management system is accordingly modified by the mechanism for automatically deploying the execution environment along with the job according to this embodiment, such that the jobs of different users are mutually isolated during the process of running the jobs, and meanwhile, the burden of the user in environment configuration is reduced.

S2) in this embodiment specifically includes the following steps:

S21) issuing a login request by the user to the login node of the high-performance computing system.

S22) continuously monitoring by a daemon process at the login node, launching a lightweight execution environment as a login space of the user after the login request of the user is received, wherein the lightweight execution environment comprises an isolation process having a complete process tree, and an empty upper file system.

S23) logging by the user in the lightweight execution environment that is launched at the login node.

S3) in this embodiment specifically includes the following steps:

S31) directly using a standard configuration of the lower file system by the user according to actual needs, wherein the standard system environment maintained by the system administrator is taken as a lower layer of the overlay file system, and users may completely share these standard configurations, for example, basic dependencies and libraries can both be used directly by the users who do not need to perform manual configuration again.

S32) carrying out development and debugging by the user on the unique job of the user's own in the upper file system; and at the same time, carrying out independent configuration by the user on a unique execution dependency, wherein both the development debugging of the user's job and the user-defined configuration are carried out on the upper layer of the overlay file system; each of the users owns his/her own unique job; carrying out the development and debugging in the upper filer system is invisible to other users; the unique execution dependencies used by the user's job are independently configured by the user, which also occurs at the upper layer of the overlay file system.

S33) executing a job running command after the development and debugging of the job of the user is completed at the login node, and issuing the job running request to the job management system.

The steps described above support the free customization of the execution environment of the user's own; a system administrator maintains and manages a lower basic environment, and the development environments among the users are mutually isolated without mutual influence. Compared with the traditional usage scenario of the high-performance computing system, the invention provides the users with greater autonomy and protects the user privacy while ensuring that the users share the standard system configuration. Meanwhile, the free customization by the user will not affect the lower system environment, thereby improving the safety of the system.

S4) in this embodiment specifically includes the following steps:

S41) assigning the corresponding compute nodes to the job by the job management system based on loads of the compute nodes in a current system after the job management system receives the job running request from the user, launching a lightweight execution environment on each of the compute nodes as an execution space for the job, wherein the lightweight execution environment comprises an isolation process having a complete process tree, and an empty upper file system.

S42) synchronizing the upper file system of the user on the login node to the assigned compute nodes, wherein the upper file system on the login node is taken as an upper file system of each of the compute nodes.

S43) executing the job by the assigned compute nodes based on a job content and a dependency required by the job of the user in the upper file system.

In the steps described above, the process of deploying the user's job and execution environment at the compute node is transparent to the user. From the user's point of view, this process is entirely completed automatically, which largely reduces the burden of the user. Meanwhile, such a mechanism of automatically deploying the execution environment along with the job is more efficient compared with the manual deployment of the user, which is particularly true in a high-performance computing scenario.

This embodiment further provides a high-performance computing-oriented apparatus for automatically deploying an execution environment. The apparatus includes a computer device, which is programmed or configured to execute the high-performance computing-oriented method for automatically deploying the execution environment along with the job as defined above.

This embodiment further provides a computer-readable storage medium. The computer-readable storage medium stores a computer program, which is programmed or configured to execute the high-performance computing-oriented method for automatically deploying the execution environment along with the job as defined above.

Described above are merely preferred embodiments of the invention, and are not intended to limit the invention in any forms. Although the invention is disclosed as above in preferred embodiments, which are not intended to limit the invention. Therefore, without departing from the contents of the technical solutions of the invention, any simple alternations, equivalent variations and modifications that are made to the embodiments above based on the technical essence of the invention shall be construed as falling within the protection scope of the technical solutions of the invention.

What is claimed is:

1. A high-performance computing-oriented method for automatically deploying an execution environment along with a job, comprising:

S1) presetting a plurality of isolated execution environments at nodes of a high-performance computing system based on an overlay file system and an isolation process, wherein the plurality of isolated execution environments are configured to implement sharing an environment for users and to implement a customization environment defined by each of the users and the automatic deployment of the execution environment defined by the each of the users;

S2) launching an isolated lightweight development environment corresponding to the user in response to the user logging in at a login node of the high-performance computing system;

S3) receiving a development and debugging operation on the job of the user and a configuration of the execution environment on the job of the user executed by the user at the login node, and issuing a job executing request to a job management system;

S4) assigning one of compute nodes from the nodes of the high-performance computing system for the job of the user, loading the job, and automatically deploying an upper file system corresponding to the user synchronously to the assigned compute node along with the job through the job management system, wherein the job of the user is executed at the assigned compute node; and S5) identifying one or more executing results generated when the job of the user is executed, and transmitting the one or more results to the login node at which the user is logged in by the assigned compute node after the job is executed, clearing the upper file system corresponding to the user at the assigned compute node, and ending the job and the isolation process.

2. The high-performance computing-oriented method for automatically deploying the execution environment along with the job according to claim 1, wherein S1) specifically comprises:

configurating a lower file system of the overlay file system based on a standard system environment, and configurating the upper file system of the overlay file system based on an executing dependency required for the job, wherein the executing dependency is defined by the user;

presetting the lower file system at the login node and the compute node of the high-performance computing system; and executing a daemon process to monitor a login request of the user at the login node, and simultaneously integrating a mechanism for automatically deploying the execution environment along with the job into the job management system.

3. The high-performance computing-oriented method for automatically deploying the execution environment along with the job according to claim 2, wherein the mechanism for automatically deploying the execution environment along with the job further comprises:

assigning the one of the compute nodes for the user in response to the job management system receiving the job executing request at the login node; and launching a lightweight execution environment at the assigned compute node, and automatically synchronizing the execution environment defined by the user at the login node to the compute node to be configured to the execution environment of the job of the user.

4. The high-performance computing-oriented method for automatically deploying the execution environment along with the job according to claim 1, wherein S2) specifically comprises:

S21) issuing a login request by the user to the login node of the high-performance computing system;

S22) continuously executing the daemon process at the login node to monitor the login request, and launching a lightweight execution environment for the user logging in in response to receiving the login request of the user at the login node, wherein the lightweight execution environment comprises the isolation process having a complete process tree and an empty upper file system; and S23) logging by the user in the lightweight execution environment launched at the login node.

5. The high-performance computing-oriented method for automatically deploying the execution environment along with the job according to claim 1, wherein S3) specifically comprises:

S31) directly using a standard configuration of the lower file system by the user according to actual needs of the user;

S32) receiving the development and debugging operation on a unique job of the user in the upper file system, and simultaneously executing an independent configuration for an executing dependency defined by the user; and S33) executing a job executing command in response to the development and debugging operation on the unique job of the user is completed at the login node, and issuing the job executing request to the job management system.

6. The high-performance computing-oriented method for automatically deploying the execution environment along with the job according to claim 1, wherein S4) specifically comprises:

S41) assigning the one of compute nodes for the job of the user based on current loads of the compute nodes of the high-performance computing system in response to the job management system receives the job executing request, launching a lightweight execution environment at the assigned compute node as an execution space for the job, wherein the lightweight execution environment comprises the isolation process having a complete process tree and an empty upper file system;

S42) synchronizing the upper file system of the user at the login node to the assigned compute node, wherein the upper file system at the login node is configured as the upper file system of each of the assigned compute node; and S43) executing the job by the assigned compute node based on a job content and an executing dependency required for the job of the user in the upper file system.

7. A high-performance computing-oriented apparatus for automatically deploying an execution environment, comprising a computer device, wherein the computer device is programmed or configured to execute the high-performance computing-oriented method for automatically deploying the execution environment along with the job according to claim 1.

8. A non-transitory computer-readable storage medium, wherein the computer-readable storage medium stores a computer program which is programmed or configured to execute the high-performance computing-oriented method for automatically deploying the execution environment along with the job according to claim 1.

* * * * *